July 31, 1962

R. W. PEER ETAL 3,047,804

APPARATUS FOR REMOVING SPURIOUS SIGNALS
FROM ELECTROMAGNETIC PROBING DEVICES
Filed April 9, 1959

INVENTORS.
Robert W. Peer
David Kigen
BY
James G. Bechtel
ATTORNEY.

United States Patent Office 3,047,804
Patented July 31, 1962

3,047,804
APPARATUS FOR REMOVING SPURIOUS SIGNALS FROM ELECTROMAGNETIC PROBING DEVICES
Robert W. Peer and David Eigen, Passaic, N.J., assignors to The Okonite Company, Passaic, N.J., a corporation of New Jersey
Filed Apr. 9, 1959, Ser. No. 805,262
6 Claims. (Cl. 324—149)

Our invention is directed to apparatus for eliminating or substantially reducing the effects of spurious signals, hereinafter referred to as interference signals, upon electromagnetic probing devices.

More specifically, we provide apparatus for the reception of desired signals from a source of electric energy, activating a transducer which may take any number of forms. For example, the transducer may be a meter, an oscilloscope, or it may be mechanism for actuating various types of equipment.

In order that our apparatus will respond only to the desired signals, we have provided means whereby the effects of interference signals upon the transducer will be eliminated or reduced so substantially as to be negligible.

Accurate activation of a transducer by certain types of weak signals is extremely difficult due to the presence of interference signals similar in character or frequency to the desired signals. These interference signals are picked up at the same time as the desired signals and obscure true indication of the wanted signals.

For example, when corona-testing electric cables, extraneous atmospheric, static, and switching surge energy impulses are often present in the surroundings. These impulses may be wide-band impulses and can be picked up throughout the electromagnetic spectrum with approximately equal intensity over the same bands of frequency as can corona. Often also tuned broadcast signals interfere at specific frequencies. These extraneous interfering energy impulses, therefore, emanate from many different and often unpredictable sources, at many different and at often varying frequencies, and are often as strong or even stronger than the corona energy impulses. Inasmuch as the wanted signals cannot be amplified by conventional equipment without amplifying the interference signals, accurate activation of the transducer is impeded or nullified.

It is an object of our invention to provide means whereby the wanted and interfering signals can be distinguished from each other, and the unwanted signals cancelled, so that the unobscured, wanted signals can be amplified to any degree desired and fed to the transducer.

At the present state of the art, the receiving apparatus has no way of distinguishing between a desired signal and an undesired or interference signal. Despite this fact, we have found one property of electromagnetics which, with the addition of any one of various simple circuits, will allow the receiving apparatus to distinguish between wanted or desired signals and unwanted or interference signals. This property is illustrated by interference signals radiating from a point source.

The amplitude of the unwanted signals falls off as the inverse square of the distance from the source. Therefore, the amplitude decreases rapidly in the first increments of the travel of the signal waves and decreases at a slower and slower rate as the waves advance. For other than point sources the amplitude of the interference waves decreases slower than where the interference emantes from a point source.

In our invention we employ a pick-up or primary probe, which can be considered as an observer of two signal sources, viz., the desired-signal source and the interference-signal source or sources. In all cases the primary probe will be very close to the desired-signal source. Usually it is in direct electrical contact with the desired-signal source. Any interference comes from sources removed from the primary probe. We then introduce a second probe or observer more remote from the desired-signal source than is the primary probe. The interference signal from a still greater distance will be substantially identical to both probes.

As above stated, the first or primary probe is so close to the desired-signal source that the second or secondary probe can be placed an inch or two from the primary probe and observe, for all practical purposes, no desired signal, as distinguished from the primary probe. The closer to the desired-signal source the two probes can be placed, with the provision that the secondary probe picks up only a negligible amount of desired signal, the nearer the interference source may be which will produce equal-amplitude interference signals in the two probes.

To be more specific, consider an operation in which the primary probe makes direct electrical contact with the desired-signal source. The secondary probe in the form of a wire, for example, can be placed along the primary probe spaced ¼ inch from it and out of electrical contact with the desired-signal source. At this spacing the secondary probe picks up a negligible amount of desired signal as compared to the amount picked up by the primary probe. The spacing of the two probes from each other, together with the degree to which the interference signal is to be picked up equally by the two probes, determines how near interference sources may be. Considering interference to be coming from point sources, the amplitude of the interference is inversely proportional to the square of the distance from the source $$\left(A \propto \frac{1}{r^2}\right)$$

Since the spacing of the probes is ¼ inch, we are interested in the degree the amplitude falls off in each ¼ inch increment from the interference source. Let ¼ inch equal the unit 1; in one foot there will be 48 units. A table showing signal amplitude A, distance r of probe from signal source, and percent change of signal amplitude between two successive increments of distance r can be made as follows:

| | r | A | Percent A[1] |
|---|---|---|---|
| ¼″ | 1 | 1 | 75 |
| ½″ | 2 | 1/4 | 56 |
| ¾″ | 3 | 1/9 | 44 |
| 1″ | 4 | 1/16 | 36 |
| 1¼″ | 5 | 1/25 | 31 |
| 1½″ | 6 | 1/36 | 27 |
| 1¾″ | 7 | 1/49 | 24 |
| 2″ | 8 | 1/64 | 21 |
| 2¼″ | 9 | 1/81 | 19 |
| 2½″ | 10 | 1/100 | |
| 1 ft. | 48 | 1/2304 | } 4.1 |
| 1¼″ | 49 | 1/2401 | |
| 2 ft. | 96 | 1/9216 | } 2.03 |
| 2¼″ | 97 | 1/9409 | |
| 5 ft. | 240 | 1/57600 | } 1.1 |
| 5¼″ | 241 | 1/58081 | |

[1] Percent $A = \frac{A_1 - A_2}{A_1} \times 100$.

For interference sources farther away, the percent difference between the interference signal picked up by the primary probe and that picked up by the secondary probe becomes smaller and smaller.

The foregoing table only contains figures for interference sources in the immediate vicinity of the installation. Normally, interference originates from sources much farther away. With proper spacing of the probes and suppression of any interference in the immediate area, all remaining interference picked up by the primary probe will be equal to that picked up by the secondary probe, for all practical purposes.

In a field-type operation, one in which the primary probe is coupled to the desired-signal source either by capacitance or inductance, the secondary probe must be placed farther from the primary probe than in the case where the primary probe is in electrical contact with the desired-signal source, to prevent the secondary probe from picking up more than a negligible amount of desired signal. This in turn requires that interference sources which can be tolerated cannot be as near as in the case where the primary probe is in electrical contact with the source of desired signal.

It is necessary to have the two probes of similar geometric shape and orientation to eliminate interference effects of all frequencies from all directions and of all polarizations. This is the crux of our invention. The failure to recognize this essential has limited the practicality of all previously devised arrangements. Although previous devices would eliminate one interference frequency of one polarization from one direction, they would not eliminate all interference frequencies of all polarizations from all directions because of the failure to appreciate the significance of employing probes of similar geometric shape and orientation, so that pickup of the two probes will be identical at each frequency throughout the frequency spectrum at any polarization and at any distance. For this reason no previous interference-cancellation device has proven commercially practicable. For permanent-type operations in which the size, geometric shape, and orientation of the primary probe including the surface measured is never altered, the probes may be duplicates of each other with a duplicate of the shape of the surface to be measured attached to the secondary probe in similar orientation as the surface to be measured is attached to the primary probe. For operations in which the size and geometric shape of the primary probe with its leads may vary and the surface measured may vary, the secondary probe may be made adjustable in size and direction in order that the secondary probe may be adjusted to similar or identical geometric shape and orientation to the size, shape, and orientation of the primary probe including the surface to be measured. The energy picked up by the two probes is fed to a circuit which adjusts the relative phase of the interference signals coming from both probes so that the interference signals oppose and cancel each other. The desired signal, which is picked up by the primary probe only, has no opposition and passes through the circuit and to the transducer unaffected.

By eliminating the effects of interference directly after the interference signal is picked up, overloading of amplification devices and other saturable components by excessive interference is avoided since the interference signals are removed before reaching these devices and components. In the practice of our invention further phase compensation of the signals is not necessary since the interference signals cancel each other before reaching components which tend to shift phase.

In the accompanying drawings.

Figure 1:
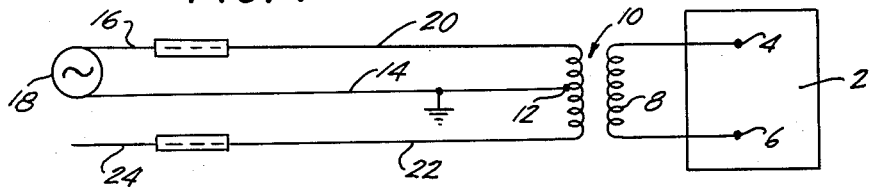
FIG. 1 shows diagrammatically an embodiment of our invention wherein we employ a center-tapped transformer.

Referring to FIG. 1 of the accompanying drawings, 2 designates a transducer, such as a meter, oscilloscope, an actuating device of any sort, etc. The input terminals 4 and 6 of the transducer are connected to the ends of the secondary 8 of a transformer 10. The primary of the transformer is center-tapped, as shown at 12, and a lead 14 is connected at one end to this center tap. The outer end of the lead 14 has been shown, merely for illustrative purposes, in electrical contact with a main source 18 of alternating-current electrical energy. This source 18, it will be appreciated, constitutes the source of the wanted signals which are to be picked up and passed to the transducer 2 comparatively free of unwanted signals emanating from some source other than energy source 18, thus ensuring accurate functioning of the transducer. 20 designates the lead of the primary probe 16. As will be seen from the drawings, the inner end of this lead is connected to the outer end of the transformer primary, while the outer end of this lead has been shown in electrical contact with energy source 18.

It will be appreciated that the desired signals from energy source 18 will be picked up by the primary probe 16, and that the probe and its lead 20 will pick up undesired signals—interference—emanating from some source other than energy source 18.

The lead 22 of secondary probe 24 is connected at its inner end to that end of the transformer primary opposite the end of the primary to which the primary-probe lead 20 is connected. The secondary-probe 24 and its lead 22 are out of electrical contact with energy source 18. In other words, the secondary probe is so positioned with respect to the energy source 18 that it is at a greater distance from the energy source than is the primary probe and will pick up no signals from this source, or any signals picked up by it from the energy source 18 will be of such low intensity as to be negligible so far as functioning of the transducer 2 is concerned.

As previously pointed out, the primary-probe 16 has been shown for illustrative purposes in electrical contact with the source of energy 18, while the secondary probe 24 is so positioned relatively to energy source 18 that it will pick up no signals from this source. It is self-evident, therefore, that the primary probe is nearer the energy source 18 than is the secondary probe, and that this relationship always exists whether the primary probe is in electrical contact with the energy source 18 or out of electrical contact with this source.

As above noted, the primary and secondary probes are of similar geometric shape and orientation so that each probe will pick up proportionate or equal amounts of interference energy at each separate or varying frequency emanating from each energy source other than energy source 18. However, the primary probe 16 and secondary probe 24 are connected to opposite ends of the center-tapped transformer primary so that interference picked up by the primary probe will be fed to the transformer primary 180 degrees out of phase with the interference picked up by the secondary probe. These out-of-phase interference signals will induce equal but opposite-phase voltages across the transformer secondary 8, and their sum will be zero. As the primary and secondary probes are of similar geometric shape and orientation, this equality of interference signal pickup on primary and secondary probes is maintained regardless of the frequency or frequencies of the interference source or sources and regardless of the shape or shapes or orientation or orientations of the interference source or sources and regardless of the distance of the interference source or sources from the probes and regardless of any combination of the above enumerated conditions so long as said distance is more remote from the probes than is the source of the desired signal, as explained earlier. It follows that the desired signals from the energy source 18, being unopposed, will transform normally and travel through the transducer 2 free of interference.

Figure 2:
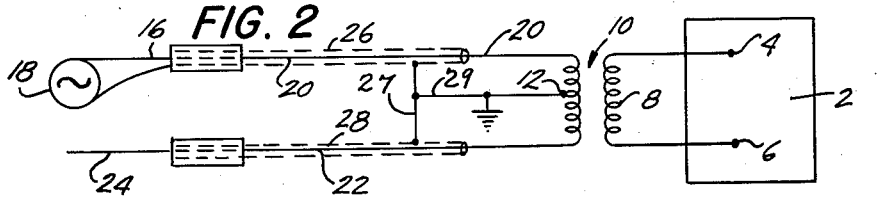
FIG. 2 illustrates another embodiment of our invention wherein we employ shielded leads for the probes forming part of our apparatus.

In FIG. 2 we have shown another embodiment of our invention in which we again employ a transformer 10, having a secondary 8, connected to transducer 2, the primary of this transformer being center-tapped at 12.

16 and 24 designate the primary and secondary probes, respectively, the lead 20 of the primary probe being connected to one end of the primary of transformer 10 and in electrical contact with source of energy 18 at its other end, as in FIG. 1. Likewise, the inner end of lead 22 of the secondary probe 24 is connected to the end of the primary winding of the transformer opposite to the connection of the primary-probe lead 20 to this winding.

26 designates shielding for the lead 20 of the primary probe, and 28 designates shielding for the lead 22 of the secondary probe. Shielding 26 and shielding 28 are connected together through lead 27, which is connected to the center tap 12 of the transformer primary through lead 29.

This embodiment functions similarly to that of FIG. 1, the primary probe 16 being deliberately positioned nearer the energy source 18 than is the secondary probe 24, so that the primary probe will pick up the desired signals from the energy source 18, while any portion of these signals which may be picked up by the secondary probe is so small as to be negligible.

The two probes are similar in geometric shape and orientation, so that each probe picks up the same amount of interference emanating from some energy source other than energy source 18. As explained in connection with FIG. 1, the leads of the two probes being connected to opposite ends of the transformer primary, the interference picked up by the primary probe will be fed to the transformer primary 180 degrees out of phase with the interference fed to the transformer primary by the secondary probe. Hence, these two signals will induce equal but opposite-phase voltages across the transformer secondary, and their sum will be zero.

It will be apparent that in this embodiment, as in the embodiment of FIG. 1, the desired signals will transform normally and travel through the transducer free of interference.

Figure 3:
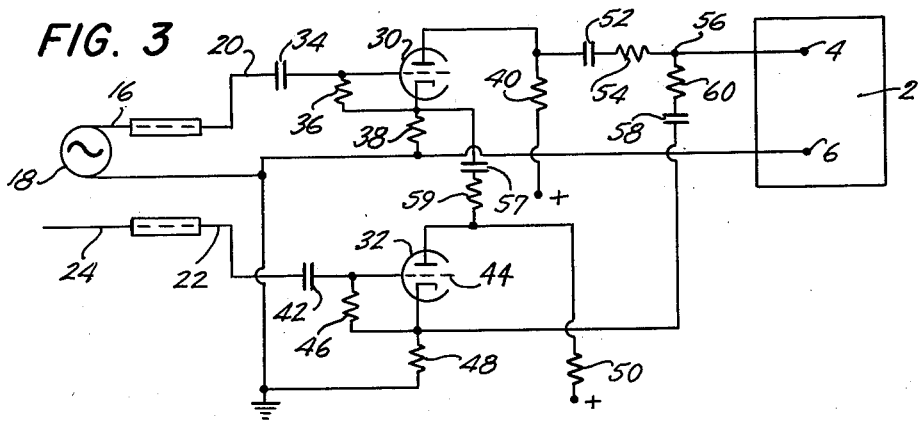
FIG. 3 illustrates a further embodiment of our invention wherein we have substituted vacuum tubes for the transformer of FIG. 1.
Figure 4:
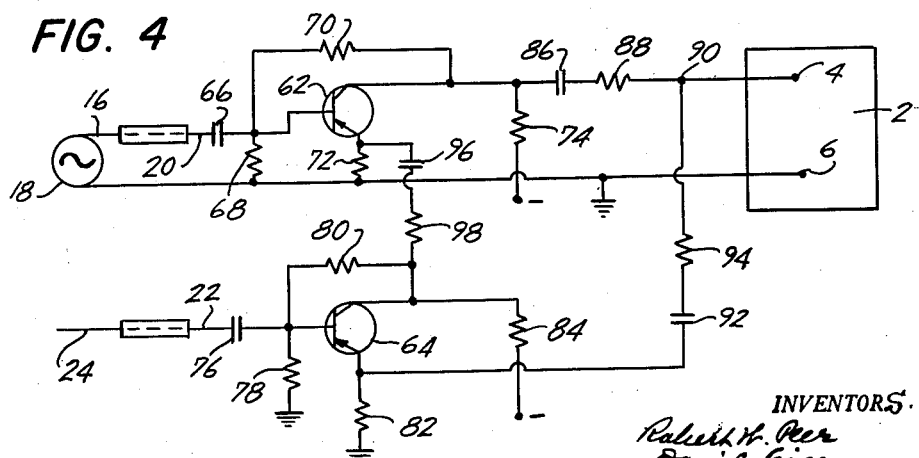
FIG. 4 illustrates a still further embodiment in which we have substituted transistors for the transformer of FIG. 1.

Before discussing the embodiment of our invention illustrated in FIGS. 3 and 4, it is to be noted that, when dealing with fixed frequencies, the transformer may be tuned accordingly by employing capacitors across the primary and/or secondary windings of the transformer. It is to be understood that the center-tapped transformer primary may be replaced with two equal primary windings, and it will be appreciated also that the signals coming from the two probes may, if desired, be amplified before being fed to the transformer. Said amplification would be necessary where the secondary probe is of similar geometric shape and orientation but not of the same size as the primary probe including the surface to be measured. In such case, the amplification of signals from primary and secondary probes would be applied to produce equal amplitudes of interference signals from the two probes.

The features referred to in the immediately preceding paragraph will be understood by those skilled in this art without further explanation.

Electronic circuits embodying vacuum tubes, transistors, or other components and having the two following properties may be employed in place of the transformer 10 of FIGS. 1 and 2:

(1) Identical interference signals fed to both inputs will be phased and coupled together in such a way that the signals cancel each other and produce no signal in the output.

(2) A signal fed to only one input must pass through the circuit and appear at the output undetectably different from its appearance at the input, or it may appear detectably different in a predetermined and consistent manner.

Referring now to FIG. 3, in which we have substituted vacuum tubes for the transformer of FIGS. 1 and 2:

16 and 24 designate the primary and secondary probes, respectively; 18 is the source of alternating-current energy from which the desired signals are picked up; and 2 is the transducer. 30 and 32 designate two triode or three-element vacuum tubes, which we employ in this embodiment as distinguished from the transformer 10 of FIGS. 1 and 2.

The lead 20 of primary probe 16 is connected through coupling capacitor 34 to the grid of the vacuum tube 30, having grid resistor 36, cathode resistor 38, and plate resistor 40.

The load on the tube 30 consists of the equal-value resistors 38 and 40. The sum of these resistors and the value of grid resistor 36 are calculated the same as in any conventional triode amplifying circuit. Due to the large amount of degeneration through cathode resistor 38, any signal from the energy source 18 picked up by the primary probe 16 will be amplified by a factor slightly less than one, the amplified signal being measured across resistor 38 or resistor 40. The signals measured across 38 and 40 are equal in magnitude but 180 degrees phase-displaced.

The lead 22 of secondary probe 24 is similarly connected through coupling capacitor 42 to the grid 44 of vacuum tube 32, having grid resistor 46, cathode resistor 48, and plate resistor 50. The operation of this section of the circuit incorporating these components is the same as that above described in the immediately preceding paragraph.

It will be seen that equal signals picked up by probes 16 and 24 produce signals of equal amplitude across 38, 40, 48, and 50. The signals across 38 and 48 are in phase, and the signals across 40 and 50 are in phase. However, the phase across either 38 or 48 is 180 degrees displaced from that across 40 or 50.

The plate of the tube 30 is connected through capacitor 52, in series with resistor 54, to junction 56. The cathode of tube 32 is also connected, through capacitor 58 in series with resistor 60, to junction 56.

The values of the capacitors 52 and 58 depend upon the low frequency response desired. Equal resistors 54 and 60 are added to give some measure of isolation between the plate of tube 30 and cathode of tube 32, and also to minimize any differences in the tubes. The values of the two resistors 54 and 60 must be low compared to the input impedance of whatever circuit is connected to the terminals 4 and 6 of the transducer to prevent any loss of desired signal.

The partial shunting of the plate of tube 30 to the cathode of tube 32 and the phase change due to capacitor 52, resistor 54, capacitor 58, and resistor 60, in series, are balanced by capacitor 57, in series with resistor 59, between the cathode of tube 30 and the plate of tube 32.

The primary and secondary probes 16 and 24, as in FIGS. 1 and 2, pick up identical interference. The interference signals from primary probe 16 reach junction 56 with an amplitude equal to that of the amplitude of interference signals from secondary probe 24 reaching the same junction. However, inasmuch as the phase of interference signals picked up by the primary probe is 180 degrees displaced from that of the signals picked up by the secondary probe, the two signals will cancel each other, and zero signal will appear across the inputs 4 and 6 of the transducer 2. The desired signals, which are only picked up by the primary probe 16, will be amplified and be fed to the transducer 2 free of interference.

Referring to FIG. 4, wherein we have illustrated another embodiment of our invention, in which we have substituted transistors for the transformer of FIGS. 1 and 2 and the vacuum tubes of FIG. 3, 16 and 24 designate the primary and secondary probes, respectively, 18 is the source of alternating-current energy from which the desired signals are picked up, and 2 is the transducer. 62 and 64 designate two transistors, which have been substituted for the transformer of FIGS. 1 and 2 and the vacuum tubes of FIG. 3.

The lead 20 of primary probe 16 is connected through coupling capacitor 66 to the base of transistor 62. Resistors 68 and 70 serve as voltage divider to establish base bias current to transistor 62 and provide a degree of D.C. stabilization. Emitter resistor 72 and collector resistor 74 comprise the load on the transistor 62. The values of the emitter resistor 72 and the collector resistor 74 are such that currents of equal magnitude are produced. Due to the large amount of degeneration through the emitter resistor 72, any signal from the primary probe 16 will be amplified by a factor slightly less than one, the amplified signal being measured across 72 or 74, and the signals measured across 72 or 74 are equal in magnitude but 180 degrees out of phase.

The lead 22 of secondary probe 24 is connected through coupling capacitor 76 to the base of transistor 64, which has divider resistors 78 and 80, emitter resistor 82, and collector resistor 84.

Identical signals picked up by the probes 16 and 24 produce equal-amplitude signals across the emitter resistor 72, collector resistor 74, emitter resistor 82, and collector resistor 84. The signals across the emitter resistors 72 and 82 are in phase, and the signals across the collector resistors 74 and 84 are in phase. However, the phase of a signal across either of the two emitter resistors is 180 degrees phase-displaced from that of a signal across either of the two collector resistors.

The collector of transistor 62 is connected through capacitor 86 and resistor 88, in series, to junction 90. The emitter of transistor 64 is connected through capacitor 92 and resistor 94 to junction 90.

The values of capacitors 86 and 92 depend upon the low-frequency response desired. Resistors 88 and 94 are inserted to give some measure of isolation between the collector of transistor 62 and the emitter of transistor 64 and to minimize any differences in the transistors used. The values of the two resistors 88 and 94 must be low compared to the input impedance of whatever circuit is connected to the terminals 4 and 6 of the transducer to prevent any loss of desired signal.

The partial shunting of the collector of transistor 62 to the emitter of transistor 64 and the phase change due to capacitor 86, resistor 88, capacitor 92, and resistor 94, in series, are balanced by capacitor 96, in series with resistor 98, between the emitter of transistor 62 and the collector of transistor 64.

Identical interference signals picked up by the probes 16 and 24 will be amplified so that the interference signals picked up by the probe 16 will reach the junction 90 with an amplitude equal to that picked up by the probe 24. However, the interference signals from the probe 16 become 180 degrees phase-displaced from those from the probe 24; hence, the two signals will cancel each other, and zero signal will be measured across terminals 4 and 6 of the transducer. The desired signals, picked up only by the primary probe 16, will be amplified and will appear at the inputs 4 and 6 of the transducer 2 free of interference.

It will be understood that in all cases where the primary probe is attached by direct contact to a surface to be measured, the secondary probe must also be altered to give similar geometric shape and orientation to duplicate the geometric shape and orientation of the primary probe including the surface being measured, to which contact is made by the primary probe. Where size of the two probes including surface to be measured is different, amplification is required to produce equal amplitudes of interference signals fed in phase opposition to the center-tapped transformer, or the larger of the two interference signals may be attenuated to attain equal amplitude and phase opposition. It will be appreciated that, due to the novelty of using the generic principle of similar geometric shape and orientation of the two probes, our invention will provide adequate cancellation of interference signals emanating from many sources at varying frequencies and regardless of the directions of the sources of the interferences or distance to the probes, provided the said distances from interference sources to the probes is greater than the distance between probes, as explained herein.

What we claim is:

1. In apparatus of the class described, the combination of a transducer; a primary probe for picking up desired signals from a source of alternating-current electrical energy; a secondary probe, similar to the primary probe in geometric shape and orientation and so positioned relatively to the source of alternating-current electrical energy as to be substantially unresponsive to the desired signals therefrom; for picking up interference signals emanating from a source other than said source of alternating-current electrical energy, said primary probe being responsive to said interference; and circuitry embodying vacuum tubes for receiving the signals, both desired and interference, picked up by the two probes, said circuitry adjusting the relative phase of the interference signals coming from the two probes so that these signals oppose and cancel each other, the desired signals picked up by the primary probe being fed by said circuitry to the transducer free of interference.

2. In apparatus of the class described, the combination of a transducer; a primary probe for picking up desired signals from a source of alternating-current electrical energy; a secondary probe, similar to the primary probe in geometric shape and orientation and so positioned relatively to the source of electrical energy as to be substantially unresponsive to the desired signals therefrom, for picking up interference signals emanating from a source other than said source of alternating-current electrical energy, said primary probe being responsive to said interference; and circuitry embodying transistors for receiving the signals, both desired and interference, picked up by the two probes, said circuitry adjusting the relative phase of the interference signals coming from the two probes so that these signals oppose and cancel each other, the desired signals picked up by the primary probe being fed by said circuitry to the transducer free of interference.

3. In apparatus of the class described, the combination of a transducer; a primary probe responsive to desired electromagnetic signals emanating from a source of alternating-current electrical energy and responsive to undesired electromagnetic signals emanating from a source removed from said source of alternating-current electrical energy; a secondary probe of similar geometric shape and orientation as the said primary probe, said secondary probe being responsive to the said undesired electromagnetic signals but being sufficiently remote from said source of alternating-current electrical energy as to be substantially unresponsive to electromagnetic signals therefrom, the response of the two probes to the undesired signals being substantially the same; and circuitry to which the energy picked up by both probes is fed, said circuitry so adjusting the relative phase of the electromagnetic undesired signals coming from the probes that these signals oppose and cancel each other, whereby the desired electromagnetic signals picked up by the primary probe pass unopposed to the transducer.

4. In apparatus of the class described, the combination of a transducer; a primary probe responsive to desired electromagnetic signals emanating from a source of alternating-current electrical energy and responsive to undesired electromagnetic signals emanating from a source removed from said source of alternating-current electrical energy; a secondary probe of similar geometric shape and orientation as the said primary probe, said secondary probe being responsive to the said undesired electromagnetic signals but being sufficiently remote from said source of alternating-current electrical energy as to be substantially unresponsive to electromagnetic signals therefrom, the response of one probe to the said undesired electromagnetic signals being less than twice that of the response of the other probe to the said undesired electromagnetic signals; and circuitry to which the energy picked up by both probes is fed, said circuitry so adjusting the relative phase of the electromagnetic undesired signals coming from the probes that these signals oppose and cancel each other, whereby the desired electromagnetic signals picked up by the primary probe pass unopposed to the transducer.

5. In apparatus of the class described, the combination of a primary probe responsive to desired electromagnetic signals emanating from a source of alternating-current electrical energy; a transducer activated by the said electromagnetic signals picked up by said primary probe; a secondary probe, similar to the primary probe in geometric shape and orientation, disposed at a greater distance from the said source of electrical energy than the primary probe and substantially unresponsive to electromagnetic signals from said electrical energy source, both probes being responsive to undesired electromagnetic signals emanating from a source which is at a greater distance from said secondary probe than the distance between the two probes; and circuitry to which the electromagnetic signals picked up by both probes are fed, said circuitry adjusting the relative phase of the undesired electromagnetic signals coming from the probes so that these undesired signals oppose and cancel each other, whereby only desired electromagnetic signals pass to the transducer.

6. In apparatus of the class described, the combination of a primary probe for picking up desired electromagnetic signals emanating from a source of alternating-current electrical energy; a transformer; a transducer connected to the secondary of said transformer; a center-tapped primary for said transformer; a lead for said primary probe connected to one end of said primary winding; a secondary probe similar to the primary probe in geometric shape and orientation; a lead for said secondary probe connected to the other end of said primary winding; and a common lead for the said two probes connected to the center tap of the transformer primary, the secondary probe being so positioned relatively to said source of electrical energy as to be substantially unresponsive to electromagnetic signals from said source, but both probes being responsive to undesired electromagnetic signals emanating from a source removed from said source of alternating-current electrical energy, said connections of the probe leads to the transformer effecting feeding to the transformer primary of the undesired electromagnetic signals picked up by the primary probe in phase opposition to the undesired electromagnetic signals picked up by the secondary probe and fed to the transformer primary, whereby the desired electromagnetic signals will pass to the transducer free of interference.

References Cited in the file of this patent
UNITED STATES PATENTS

| | | |
|---|---|---|
| 2,116,696 | De Monge | May 10, 1938 |
| 2,169,116 | Thompson | Aug. 8, 1939 |
| 2,201,337 | Franke | May 21, 1940 |
| 2,222,424 | Reid | Nov. 19, 1940 |
| 2,570,414 | Wapner | Oct. 9, 1951 |
| 2,601,510 | Frye | June 24, 1952 |
| 2,668,945 | Pfeffer | Feb. 9, 1954 |
| 2,748,202 | McCallister et al. | May 29, 1956 |
| 2,884,597 | Miller | Apr. 28, 1959 |